US010661819B2

(12) United States Patent
Heitz et al.

(10) Patent No.: US 10,661,819 B2
(45) Date of Patent: May 26, 2020

(54) MOTOR-ADJUSTABLE STEERING COLUMN FOR A MOTOR VEHICLE

(71) Applicants: THYSSENKRUPP PRESTA AG, Eschen (LI); thyssenkrupp AG, Essen (DE)

(72) Inventors: Thomas Heitz, Mauren (LI); Daniel Kreutz, Feldkirch (AT); Francisco Sinis Jáuregui, Feldkirch (AT)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 139 days.

(21) Appl. No.: 15/754,055

(22) PCT Filed: Aug. 2, 2016

(86) PCT No.: PCT/EP2016/068393
§ 371 (c)(1),
(2) Date: Feb. 21, 2018

(87) PCT Pub. No.: WO2017/032566
PCT Pub. Date: Mar. 2, 2017

(65) Prior Publication Data
US 2018/0251147 A1 Sep. 6, 2018

(30) Foreign Application Priority Data
Aug. 26, 2015 (DE) .................. 10 2015 216 326

(51) Int. Cl.
*B62D 1/181* (2006.01)
*B62D 1/185* (2006.01)
*B62D 1/183* (2006.01)

(52) U.S. Cl.
CPC ............. *B62D 1/181* (2013.01); *B62D 1/183* (2013.01); *B62D 1/185* (2013.01)

(58) Field of Classification Search
CPC ................................ B62D 1/181; B62D 1/185
See application file for complete search history.

(56) References Cited

U.S. PATENT DOCUMENTS 4,774,851 A * 10/1988 Iwanami ................ B62D 1/184
188/371
4,805,478 A 2/1989 Beauch
(Continued)

FOREIGN PATENT DOCUMENTS

CN 1662411 A 8/2005
CN 1840404 A 10/2006
(Continued)

OTHER PUBLICATIONS

English Translation of International Search Report issued in PCT/EP2016/068393, dated Nov. 4, 2016 (dated Nov. 17, 2016).

*Primary Examiner* — Nicole T Verley
(74) *Attorney, Agent, or Firm* — thyssenkrupp North America, LLC

(57) ABSTRACT

A motor-adjustable steering column may include a support unit that is connectable to a vehicle body and holds an adjustment unit. The adjustment unit may include a steering spindle mounted in a casing unit rotatably about a longitudinal axis. The casing unit may include an outer casing tube that receives an inner casing tube in an axially displaceable, telescopic fashion. An adjustment drive may be connected to the inner and outer casing tubes. The inner casing tube can be retracted and deployed axially relative to the outer casing tube. An intermediate casing tube may be disposed coaxially between the inner and outer casing tubes so as to be axially displaceable in telescopic fashion relative to the inner and outer casing tubes. The intermediate casing tube can be axially retracted and deployed relative to the inner and outer casing tubes by the adjustment drive.

11 Claims, 8 Drawing Sheets

(56) References Cited

U.S. PATENT DOCUMENTS

| | | | | |
|---|---|---|---|---|
| 5,193,848 | A * | 3/1993 | Faulstroh | B62D 1/181 280/775 |
| 5,590,565 | A * | 1/1997 | Palfenier | B62D 1/181 74/493 |
| 5,722,300 | A * | 3/1998 | Burkhard | B62D 1/185 280/775 |
| 6,473,968 | B1 * | 11/2002 | Mastrofrancesco | B62D 1/185 29/458 |
| 6,729,648 | B2 | 5/2004 | Ulintz | |
| 6,848,334 | B2 * | 2/2005 | Kluemper | B62D 1/192 280/777 |
| 7,527,295 | B2 * | 5/2009 | Oshita | B62D 1/192 280/777 |
| 7,726,691 | B2 | 6/2010 | Yamada | |
| 7,748,742 | B2 * | 7/2010 | Higashi | B62D 1/192 280/777 |
| 7,975,569 | B2 * | 7/2011 | Klos | B62D 1/185 280/777 |
| 8,408,089 | B2 * | 4/2013 | Oshita | B62D 1/195 280/775 |
| 9,056,627 | B2 * | 6/2015 | Thompson | B62D 1/184 |
| 9,260,130 | B2 * | 2/2016 | Mizuno | B62D 1/187 |
| 9,637,158 | B2 * | 5/2017 | Kingston-Jones | B62D 1/185 |
| 9,956,985 | B2 * | 5/2018 | Brzezinski | B62D 1/185 |
| 10,137,923 | B2 * | 11/2018 | Sikotra | B62D 1/184 |
| 10,160,472 | B2 * | 12/2018 | Bodtker | B62D 1/183 |
| 10,160,473 | B2 * | 12/2018 | Bodtker | B62D 1/183 |
| 10,160,475 | B2 * | 12/2018 | Uesaka | B62D 1/184 |
| 2005/0173914 | A1 | 8/2005 | Sadakata | |
| 2006/0028010 | A1 | 2/2006 | Yamada | |
| 2006/0048597 | A1 | 3/2006 | Heim | |
| 2006/0219043 | A1 | 10/2006 | Fujiu | |
| 2008/0079253 | A1 | 4/2008 | Sekii | |
| 2009/0266187 | A1 * | 10/2009 | Okada | B62D 1/181 74/89.23 |
| 2011/0041643 | A1 * | 2/2011 | Watanabe | B62D 1/185 74/493 |
| 2011/0239809 | A1 * | 10/2011 | Beneker | B62D 1/16 74/493 |
| 2012/0247259 | A1 | 10/2012 | Mizuno | |
| 2015/0068352 | A1 | 3/2015 | Heitz | |
| 2017/0057541 | A1 * | 3/2017 | Bodtker | B62D 1/20 |
| 2017/0120944 | A1 * | 5/2017 | Kato | B62D 1/181 |
| 2019/0185041 | A1 * | 6/2019 | Shin | B62D 1/04 |
| 2019/0225255 | A1 * | 7/2019 | Ishimura | B62D 1/181 |

FOREIGN PATENT DOCUMENTS

| | | | |
|---|---|---|---|
| CN | 101152874 A | 4/2008 | |
| CN | 201534560 U | 7/2010 | |
| DE | 3805869 A1 * | 11/1989 | B62D 1/181 |
| DE | 102008005256 A | 8/2009 | |
| DE | 102013001442 | 3/2014 | |
| DE | 202014101156 U | 3/2014 | |
| DE | 102013104958 A | 7/2014 | |
| DE | 102013103328 A | 10/2014 | |
| DE | 102014101995 A | 1/2015 | |
| DE | 102014016510 | 2/2015 | |
| DE | 102014103028 | 2/2015 | |
| DE | 102014103028 B3 * | 2/2015 | |
| DE | 102016202465 B4 * | 5/2019 | |
| EP | 2508409 A | 10/2012 | |
| EP | 2500241 B1 * | 10/2014 | |
| EP | 20808225 A | 12/2014 | |
| EP | 2894077 A1 * | 7/2015 | |
| GB | 2408970 A | 6/2005 | |
| JP | 5229551 B2 | 7/2013 | |
| JP | 5750949 B2 * | 7/2015 | |
| JP | 6481374 B2 * | 3/2019 | |
| WO | WO-2014175224 A1 * | 10/2014 | |
| WO | WO-2015132105 A1 * | 9/2015 | |
| WO | WO-2018210727 A1 * | 11/2018 | B62D 1/185 |

* cited by examiner

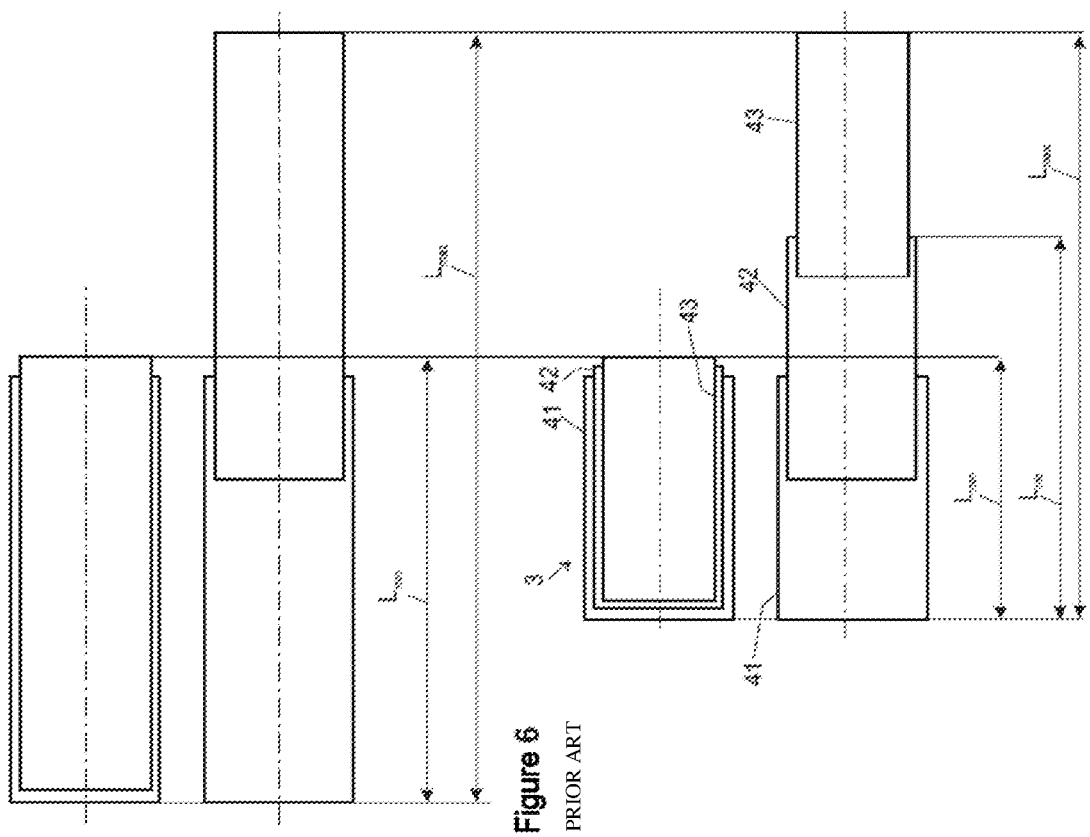

MOTOR-ADJUSTABLE STEERING COLUMN FOR A MOTOR VEHICLE

CROSS REFERENCE TO RELATED APPLICATIONS

This application is a U.S. National Stage Entry of International Patent Application Serial Number PCT/EP2016/068393, filed Aug. 2, 2016, which claims priority to German Patent Application No. DE 10 2015 216 326.1, filed Aug. 26, 2015, the entire contents of both of which are incorporated herein by reference.

FIELD

The present disclosure generally relates to steering columns, including motor adjustable steering columns for motor vehicles.

BACKGROUND

Steering columns for motor vehicles comprise a steering shaft with a steering spindle, on the rear end of which in a direction of travel, which end faces toward the driver, there is mounted a steering wheel for the introduction of a steering demand by the driver. The steering spindle is mounted rotatably in an adjustment unit which is mounted on the vehicle body by means of a support unit, which support unit, for the connection to the vehicle body, comprises for example bracket parts which hold the adjustment unit. Adjustable steering columns permit the adjustment relative to the vehicle body and thus an adaptation of the steering wheel position to the driver's position.

Adjustability in a longitudinal direction, that is to say in an axial direction of the steering spindle, for the longitudinal adjustment of the steering wheel may be realized by virtue of the adjustment unit being designed to be variable in length, for example by means of an arrangement of casing tubes which is telescopable in the longitudinal direction, as described in the prior art in, for example, DE 10 2014 101 995 A1 or DE 10 2008 005 256 B4. These disclose an adjustment unit with an inner casing tube which is mounted in an outer casing tube so as to be capable of sliding in an axial direction. For the adjustment in the direction toward the driver's position, the inner casing tube can be moved telescopically out of the outer casing tube, and correspondingly, for the adjustment in the direction away from the driver's position, said inner casing tube can be retracted into the outer casing tube.

It is known in the prior art, for the execution of the adjustment movement of the adjustment unit relative to the support unit, to provide a motor adjustment drive which comprises, for example, an electric motor which is coupled to the adjustment unit by means of a gear mechanism and which permits electrical control of the steering wheel positioning.

For the longitudinal adjustment, a linear motor adjustment drive is used between the inner and outer casing tubes. By means of the adjustment drive, the casing tubes can be moved in translational fashion relative to one another in the direction of the longitudinal axis, such that the inner casing tube is deployed or retracted in telescopic fashion relative to the outer casing tube. The adjustment drive may be realized for example by means of a spindle drive which comprises a spindle nut screwed onto a threaded spindle, which spindle nut can be driven in rotation relative to the spindle by an electric motor. For the function, it is essential here that the casing tubes can be moved freely relative to one another in both longitudinal directions, that is to say slide with adequately low friction, such that they can be moved reliably by the adjustment drive for the retraction and deployment.

An advantage of motor-adjustable steering columns lies in the increase in driving and operating comfort, for example by virtue of the fact that individual steering wheel positions for different drivers can be electronically stored and automatically retrieved and set when required. It is furthermore of particular interest for the steering column to be moved into predefined positions automatically in certain operating situations. For example, during autonomous driving during travel, no manual steering intervention by the driver is necessary, such that the steering wheel can in principle be stowed outside the operating position in order that the vehicle interior space thereby freed up can be put to alternative use. A stowable steering column of said type is described for example in DE 20 2014 101 156.

The known steering columns that can be longitudinally adjusted by motor means duly permit a shortening of the adjustment unit by retraction of the inner casing tube, such that, in the retracted state, space is freed up relative to the driver's position. It is however a disadvantage that the known steering columns either cannot be retracted far enough for stowage purposes, or comprise relatively large dimensions in a longitudinal direction in the retracted state in order to realize an adequate adjustment travel.

Thus a need exists for a motor-adjustable steering column that makes it possible to realize an increased adjustment range along with small dimensions in a retracted state.

BRIEF DESCRIPTION OF THE FIGURES

FIG. 6 is a schematic view of a prior art casing unit.

FIG. 7 is a schematic view of an example casing unit of the present disclosure.

DETAILED DESCRIPTION

Figure 1:
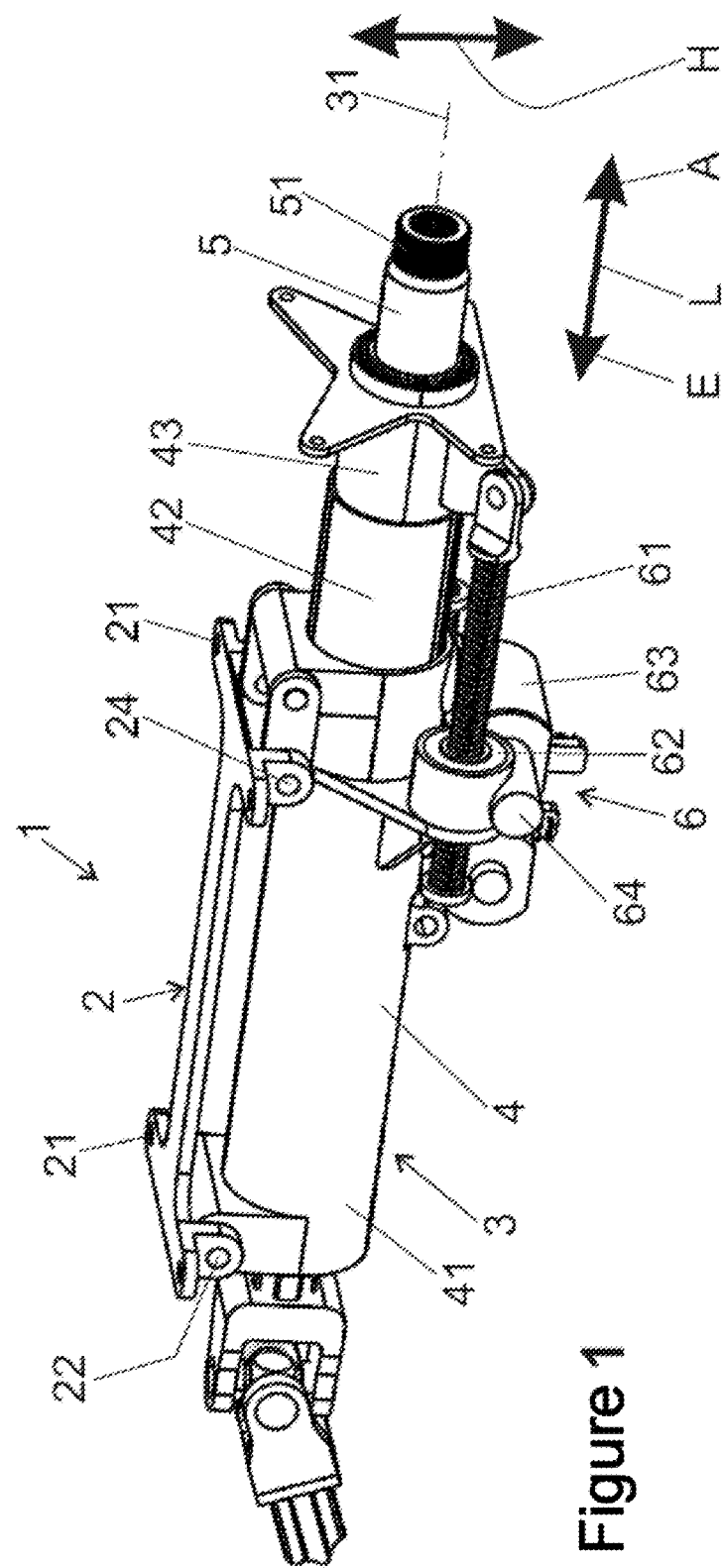
FIG. 1 is a schematic perspective view of an example steering column in a partially deployed state.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by 'at least one' or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to motor-adjustable steering columns for motor vehicles. In some examples, a motor-adjustable steering column may include a support unit that is connectable to a vehicle body and holds an adjustment unit. The adjustment unit may comprise a steering spindle that is mounted in a casing unit so as to be rotatable about a longitudinal axis. The casing unit may comprise an outer casing tube in which an inner casing tube is received so as to be axially displaceable in telescopic fashion. A linear adjustment drive may be connected to the inner and the outer casing tube, and the inner casing tube may be retracted and deployed axially relative to the outer casing tube.

One example to overcome the problems discussed in the background is to arrange coaxially between the outer casing tube and the inner casing tube at least one intermediate casing tube (middle casing tube) that is received in the outer casing tube so as to be axially displaceable in telescopic fashion with low friction and in which the inner casing tube is mounted so as to be axially displaceable in telescopic fashion with low friction.

According to the invention, the motor-adjustable steering column comprises at least one additional casing tube, that is to say intermediate casing tube, also referred to as middle casing tube, which is telescopable relative to the inner and outer casing tubes in the direction of the longitudinal axis. By virtue of the fact that at least three casing tubes are arranged telescopically one inside the other, it is possible in the case of a motor-adjustable steering column to realize a greater relative adjustment travel, which refers to the ratio of the lengths in the fully deployed state in relation to the fully retracted state, than in the case of a known motor-adjustable steering column with only two casing tubes. Specifically, in the case of two casing tubes, for the relative adjustment travel of the telescopic arrangement, it is possible to realize a theoretical maximum value of 2, that is to say a shortening by half, whereas, in the case of three casing tubes, it is possible to realize a theoretical maximum value of 3, that is to say a shortening to one third. In practice, the theoretical maximum value, which is based on casing tubes retracted fully into one another and casing tubes deployed fully out of one another, cannot be achieved, because, in order to ensure an adequate flexure of stiffness of the telescopic arrangement, the casing tubes must be mounted coaxially one inside the other over a length section even in the fully deployed state, and protrude in the longitudinal direction in the fully retracted state. Through the use according to the invention of a telescopic arrangement with three or more parts, however, it is possible in practice to realize a considerably longer relative adjustment travel than in the case of the generic motor-adjustable steering columns. It is thus possible, for a given adjustment travel that is required in applications for example in an autonomously driving vehicle, to realize more compact dimensions of the steering column in the retracted state than in the prior art, such that less stowage space is required for the stowage of the steering column.

In the case of the invention, the casing tubes mounted one inside the other are designed to exhibit low friction with regard to their relative sliding movement in the longitudinal direction, such that the sum total of the friction forces to be overcome during the retraction or deployment—static and sliding friction—between the casing tubes is lower than the translational drive force exerted on the casing tubes by the adjustment drive. "Low friction" is to be understood to mean a prevailing coefficient of sliding friction between the respective friction partners, that is to say in this case the casing tubes that are respectively in contact with one another, with a value less than or equal to 0.15. In this way, the casing tubes can be moved freely such that the steering column can be reliably moved into any demanded adjustment position at any time by the adjustment drive. This requirement is advantageous in particular for use in an autonomously driving vehicle, in which the steering wheel must be capable of being quickly and reliably deployed at any time during travel from a stowed position into an operating position in the area of reach of the driver.

In an advantageous refinement, it may be provided that the casing unit comprises a minimum length and a maximum length, and the intermediate casing tube is displaceable over a maximum axial travel, wherein a ratio of the maximum axial travel to the difference between the maximum length and the minimum length comprises a value between 0.2 and 0.8. It can thereby be achieved that the casing unit still exhibits adequate flexure of stiffness, because the individual casing tubes—specifically outer casing tube, inner casing tube and intermediate casing tube—of the casing unit still adequately overlap in the axial direction, or in other words, are still received one inside the other to an adequate extent.

The difference between the maximum length and the minimum length of the casing unit corresponds to the maximum telescopic travel of the casing unit, in other words the travel between the fully deployed position and the fully retracted position of the casing unit. The ratio thus emerges from the ratio of the maximum axially displaceable travel of the casing tube to the maximum telescopic travel of the casing unit.

The value of the ratio particularly preferably lies between 0.3 and 0.7.

In the case of the invention, it may be provided that the intermediate casing tube and the inner and/or outer casing tube are designed to exhibit low friction on their casing surfaces which respectively face one another. The inner and outer casing surfaces which face toward one another and slide on one another during the telescopic retraction and deployment determine, by means of their relative dimensions and the material and the surface condition, the friction forces that the motor adjustment drive must overcome for the adjustment of the steering column in or counter to the longitudinal direction. The contact or sliding surfaces that are moved relative to one another here may be provided, on the inside and/or on the outside, with a friction-reducing coating, for example with a wear-resistant hard material coating and/or a plastics layer with permanent sliding capability. Alternatively or in addition, lubricant may be introduced, and/or sliding pieces or sliding bushings between the casing tubes, composed for example of PTFE. In this way, it can be ensured that, even after a multiplicity of adjustment movements, such as are to be expected for example over the service life of a vehicle in the case of autonomous driving, the friction forces for the adjustment of the steering column remain in a range which ensures a reliable adjustment of the steering column by means of the motor adjustment drive.

An advantageous refinement of the invention provides that, with regard to an axial displacement, a first friction force between the intermediate casing tube and the outer casing tube is lower than a second friction force between the intermediate casing tube and the inner casing tube. Through the different setting of the friction forces, the sequence of the telescopic movement of the individual casing tubes relative to one another during the retraction and deployment can be defined. During the translational relative movement of the inner and outer casing tubes by means of the motor adjustment drive, the intermediate casing tube is driven along in the longitudinal direction by the acting friction forces. By virtue of the fact that the first friction force is lower, it is overcome first during a relative movement, and consequently, during the retraction or deployment, it is firstly the case that the intermediate casing tube is retracted or deployed relative to the outer casing tube. When said movement travel is limited, for example by a longitudinal stop, the higher second friction force is overcome by the adjustment drive, and the inner casing tube is moved telescopically relative to the intermediate casing tube. There is consequently a defined behavior during the retraction and deployment, which behavior can be optimized with regard to the stability of the telescopic arrangement. Alternatively or in addition, sections with two or more mutually different friction forces may be formed in a longitudinal direction, which sections are, during the retraction or deployment of the telescopic arrangement, moved relative to one another in a longitudinal direction in an ascending sequence with regard to the acting friction force.

It is likewise alternatively conceivable for the lower, first friction force between the inner casing tube and the intermediate casing tube to be predefined such that firstly the inner casing tube is deployed out of the intermediate casing tube, and when the latter has been fully deployed, the intermediate casing tube is driven along by the inner casing tube and moved out of the outer casing tube.

It may be provided that the intermediate casing tube comprises an outwardly protruding outer stop element on its outer side, and the outer casing tube comprises an inwardly protruding inner stop element, wherein the passage cross section of the inner stop element is larger than the cross section of the intermediate casing tube and smaller than the cross section of the outer stop element of the intermediate casing tube. The outer and inner stop elements form stop elements in a longitudinal direction, by means of which the maximum adjustment travel of the intermediate casing tube, specifically the maximum pulled-out extent during the deployment of the adjustment unit, relative to the outer casing tube is limited. For the retraction and deployment in the longitudinal direction, the intermediate casing tube can be moved in telescopic fashion through the inner stop element until the end position is limited by virtue of the radially outwardly protruding outer stop element arranged at the front end of the intermediate casing tube in the direction of travel coming to lie in the axial direction against the inner stop element that is situated on the rear end region of the outer casing tube in the direction of travel. The interacting stop elements arranged in each case on those ends of the intermediate casing tube and of the outer casing tube which face toward one another thus likewise form a pull-out retention means which prevents the casing tubes from being separated from one another in a longitudinal direction.

It may correspondingly be provided that the intermediate casing tube comprises an inwardly protruding inner stop element on its inner side, and the inner casing tube comprises an outwardly protruding outer stop element, wherein the passage cross section of the inner stop element is larger than the cross section of the inner casing tube and smaller than the cross section of the outer stop element of the inner casing tube. For the retraction and deployment in the longitudinal direction, the inner casing tube can be moved in telescopic fashion through the inner stop element until the end position is limited by virtue of the radially outwardly protruding outer stop element arranged at the front end of the inner casing tube in the direction of travel coming to lie in the axial direction against the inner stop element that is situated on the rear end region of the intermediate casing tube in the direction of travel. A longitudinal stop which acts between the intermediate casing tube and the inner casing tube is thus formed. The stop elements arranged in each case on those ends of the intermediate casing tube and of the inner casing tube which face toward one another furthermore serve as a pull-out retention means.

The above-described stop elements—inner and outer stop elements—have the effect, in particular during the deployment of the steering column, that is to say during the telescopic outward movement, that, when the intermediate casing tube abuts against the outer casing tube, the inner casing tube is moved out of the intermediate casing tube, or, in the reverse sequence, the inner casing tube is firstly deployed and, when the stop is reached, drives along the intermediate casing tube and moves the latter out of the outer casing tube. As described above, the sequence may be predefined for example by means of differently predefined friction forces between the casing tubes. The inner and outer stop elements form drivers by means of which the intermediate casing tube according to the invention is driven along in the direction of the longitudinal axis by the inner or outer casing tube respectively during the telescopic deployment. In the case of an arrangement with two or more than two intermediate casing tubes arranged in telescopic fashion one inside the other in order to realize a greater relative adjustment travel, the intermediate casing tubes may each comprise corresponding inner and outer stop elements by means of which an intermediate casing element can be driven along by an intermediate casing element arranged telescopically therein.

An inner stop element may be realized by means of a projection that protrudes radially inwardly into the free passage cross section of a casing tube, which projection may be formed as an encircling step, as a flange or as a collar, or by means of a multiplicity of individual projections. Correspondingly, an outer stop element may be formed by a radially outwardly protruding projection. Here, it is essential that the stop elements can be supported axially against one another with respect to the direction of the deployment in order to limit the pulling-out movement in the direction of the longitudinal axis.

In an advantageous refinement, the intermediate casing tube and the inner casing tube are connectable by means of a latching device, wherein the latching device comprises a latching body, which is connected to the intermediate casing tube, and a counterpart latching body, which corresponds to the latching body and which is connected to the inner casing tube. By means of the latching device, it can be achieved that the intermediate casing tube and the inner casing tube move telescopically out of the outer casing tube in synchronous fashion, because the intermediate casing tube and the inner casing tube are connected by means of the latching device. As soon as the maximum axial telescopic travel of the intermediate casing tube is reached, for example as a result of the abutment of the outer stop element of the intermediate casing tube against the inner stop element of the outer casing tube, the counterpart body unlatches from the latching body. The capability of the inner casing tube to independently move telescopically relative to the intermediate casing tube is thus enabled, such that a relative displacement of the inner casing tube relative to the outer casing tube can take place. The latching of the latching body and counterpart latching body occurs as soon as the inner casing tube has telescopically moved fully into the intermediate casing tube again. This may preferably occur by virtue of the latching body comprising at least one spring tongue. The spring tongue preferably comprises a contact geometry which can latch with the counterpart latching body and which is designed such that a higher force in the axial direction is required for the unlatching than for the latching. This may be realized by means of different angles between the contact surfaces and the longitudinal axis of the steering spindle in the retraction and deployment directions. A relatively high axial force for the unlatching is necessary if the contact surface is relatively steep, that is to say at an obtuse angle with respect to the longitudinal axis, whereas a relatively low force is required if the contact surface is relatively level, that is to say at a relatively acute angle with respect to the longitudinal axis.

It is furthermore possible for the adjustment drive to be operatively connected to the intermediate casing tube for the constrained positioning of the intermediate casing tube relative to the inner and/or outer casing tube. Whereas, in the embodiments described above, the intermediate casing tube is driven along in an axial direction by one of the two other casing tubes during the deployment, it may alternatively or additionally be provided that the intermediate casing tube is moved directly in a defined manner by the adjustment drive. In this way, it is for example possible to realize that the inner casing tube is deployed out of the intermediate casing tube to the same extent as the intermediate casing tube is deployed from the outer casing tube, that is to say the movement of the intermediate casing tube can be predefined independently of a stop being reached. For this purpose, the adjustment drive may for example comprise spindle drives with two different thread pitches, which engage on the intermediate casing tube and on one of the two casing tubes, or lever mechanisms, or toothed rack mechanisms, or cable pull/chain mechanisms or the like.

It is furthermore advantageous that the adjustment drive comprises a spindle drive, having a spindle nut, which is arranged on a threaded spindle, and having a motor drive, by which the threaded spindle and the spindle nut can be driven in rotation relative to one another. Such adjustment drives are known in principle from the prior art, and are reliable and robust. Here, the spindle nut is attached non-displaceably to one casing tube in the direction of the longitudinal axis, and the threaded spindle is attached to the other casing tube that can move telescopically relative to the former casing tube. The spindle nut or the threaded spindle is driven in rotation by an electric adjustment motor via a suitable gear mechanism, for example a worm gear mechanism or belt mechanism, whereby the threaded spindle or spindle nut, which is static relative thereto with regard to the rotation, is moved in translational fashion in the direction of the spindle longitudinal axis. As mentioned, it is also conceivable to provide threaded spindles and spindle nuts with different thread pitches in order for the intermediate casing tube according to the invention to be moved directly by the spindle drive.

It may furthermore be provided that the adjustment unit is mounted on the support unit so as to be pivotable in height about a pivot axis lying transversely with respect to the longitudinal axis. By means of the pivoting about such a horizontal pivot axis, a height adjustment can be realized, with which the steering wheel attached to the rear end of the steering spindle can be adjusted in height relative to the driver's position.

The abovementioned height adjustment may be performed manually. In particular, for the automated stowage of the steering column during autonomous driving, it is advantageous for an electric height adjustment drive to be connected to the support unit and to the adjustment unit, by means of which height adjustment drive the adjustment unit is movable relative to the support unit about the pivot axis. The height adjustment drive is likewise known per se, and may for example be realized as a spindle drive driven by electric motor, as described above for the longitudinal adjustment.

It is likewise conceivable and possible for the casing tubes to comprise a non-circular-cylindrical cross-sectional profile, for example a triangular, tetragonal, pentagonal, hexagonal, heptagonal or octagonal cross-sectional profile, wherein this list may be continued to any desired extent.

It is furthermore conceivable and possible, in order to minimize the friction, for rolling bodies to be arranged between the casing tubes, wherein the rolling bodies, preferably balls and/or cylindrical rollers, may preferably be accommodated and guided in an intermediate sleeve.

It is furthermore likewise possible for at least one sliding element, for example a sliding sleeve, to be arranged between the casing tubes. In this way, the friction can be adapted and/or reduced, and the telescopic capability of the casing tubes relative to one another can be improved. The calibration of the sliding sleeve for the purposes of setting the friction force can be performed during the assembly of the casing tubes, for example by ultrasound welding.

Figure 2:
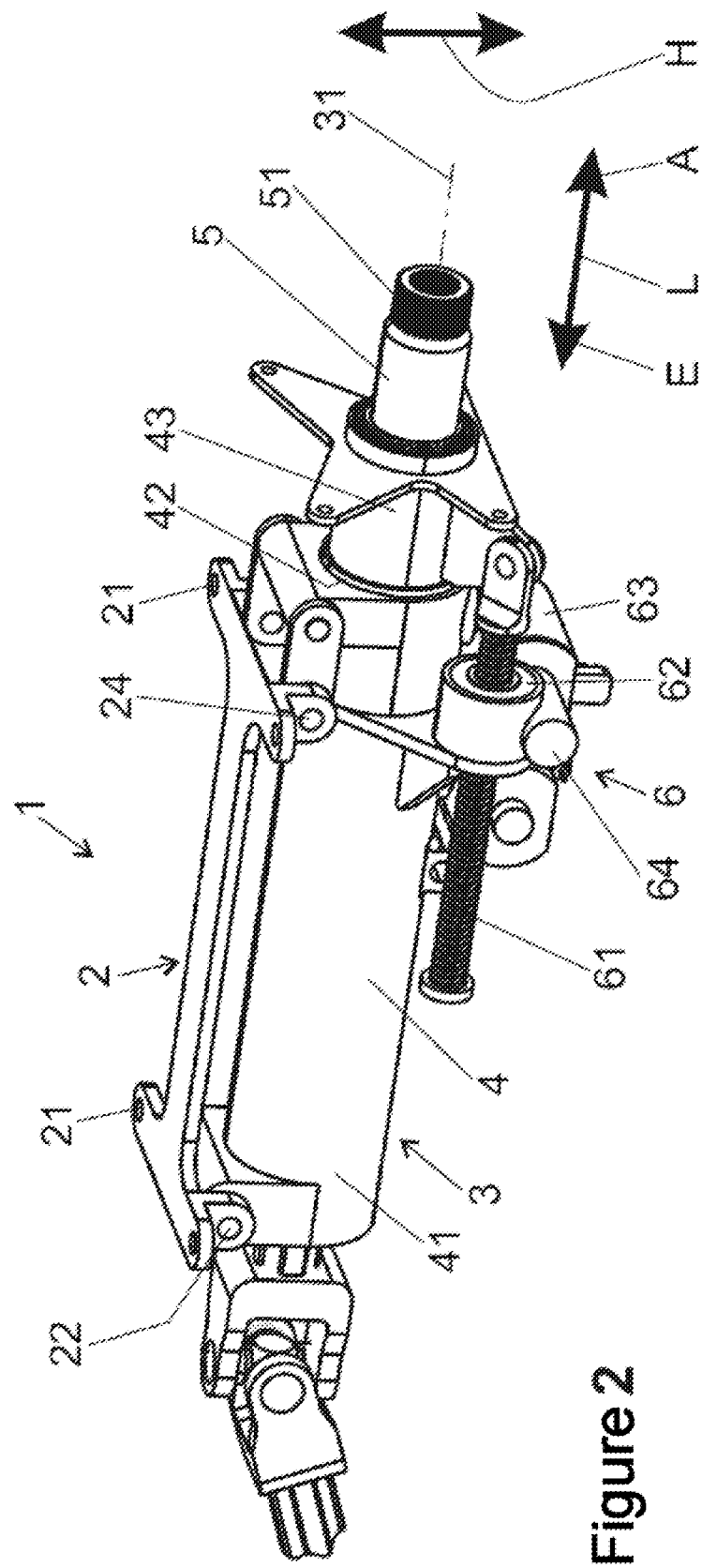
FIG. 2 is a schematic perspective view of the example steering column of FIG. 1 in a collapsed state.
Figure 3:
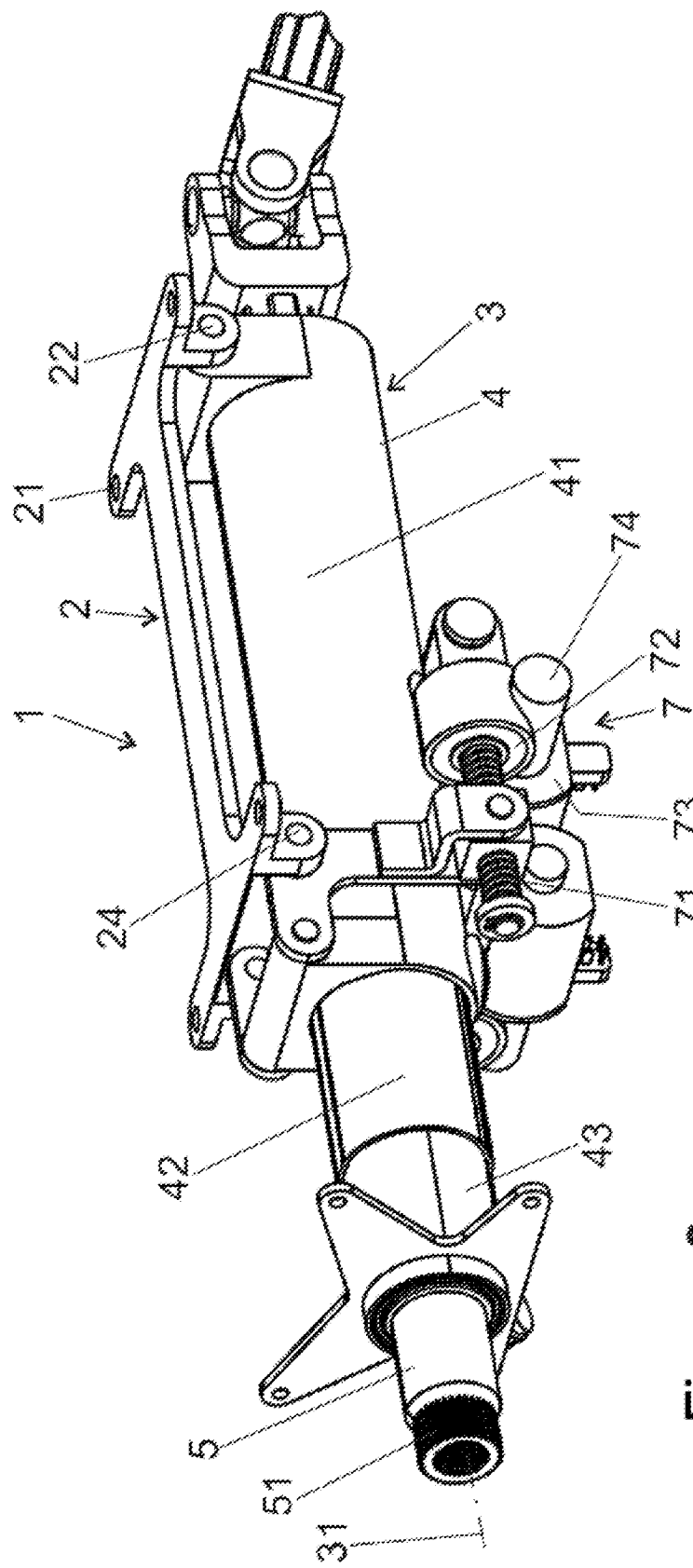
FIG. 3 is another perspective view of the example steering column of FIG. 1.

FIGS. 1, 2 and 3 show a steering column 1 according to the invention in schematic perspective views of the rear end, in relation to the direction of travel of a vehicle (not illustrated), from obliquely laterally above. FIG. 2 shows the fully retracted state, and FIGS. 1 and 3 show a (partially) deployed state, from the left-hand side (FIG. 1) and from the right-hand side (FIG. 3).

The steering column 1 comprises a support unit 2, which comprises fastening means 21 for the connection to a motor vehicle body (not illustrated). The support unit 2 holds an adjustment unit 3, which comprises a casing unit 4 in which a steering spindle 5 is mounted so as to be rotatable about a longitudinal axis 31 of the adjustment unit 3. On the rear end with respect to the direction of travel, the steering spindle 5 is equipped with a fastening section 51 for the attachment of a steering wheel (not illustrated here).

In its front end region, the casing unit 4 is mounted on the support unit 2 so as to be pivotable about a horizontal pivot axis 22 lying transversely with respect to the longitudinal axis 31. In the rear end region, the casing unit 4 is connected to the support unit 2 by means of an adjustment lever 23. A rotational movement of the adjustment lever 23 about the axis 24 causes a pivoting of the adjustment unit 3 about the pivot axis 22, and thus an adjustment of the steering wheel in the height direction H, as indicated by the double arrow.

In the embodiment illustrated, the casing unit 4 comprises an outer casing tube 41, an intermediate casing tube 42 and an inner casing tube 43. In the outer casing tube 41, which is mounted on the support unit 2 so as to be non-displaceable in the longitudinal direction L with respect to the longitudinal axis 31, the intermediate casing tube 42 and the inner casing tube 43 are arranged coaxially one inside the other and are arranged so as to be telescopically retractable and deployable in the longitudinal direction L parallel to the longitudinal axis 31, as indicated by the double arrow. Here, the deployment takes place rearwardly in the deployment direction A, and the retraction correspondingly takes place, in the opposite direction, forwardly in the retraction direction E.

For the longitudinal adjustment, that is to say for the retraction and deployment, an electromotive adjustment drive 6 is provided. This is in the form of a spindle drive and comprises a threaded spindle 61, which extends parallel to the longitudinal axis 31 and which is attached with its rear end rotationally fixedly to the inner casing tube 43. A spindle nut 62 is screwed onto the threaded spindle 61 and can be driven in rotation by an electric adjustment motor 63 via a gear mechanism 64, which may for example be in the form of a worm gear mechanism. Together with the gear mechanism 64, the spindle nut 62 is connected to the outer casing tube 41 fixedly, that is to say non-displaceably, with respect to the longitudinal direction L, such that a rotation gives rise, in a manner dependent on the direction of rotation, to a translation of the threaded spindle 61 in the retraction direction E or in the deployment direction A, and thus to a retraction or deployment of the inner casing tube 43 relative to the intermediate casing tube 42 and the outer casing tube 41.

According to the invention, the inner casing tube 43 is mounted in the intermediate casing tube 42, and the intermediate casing tube 42 is mounted in the outer casing tube 41, so as to be displaceable in the longitudinal direction L, that is to say in the retraction direction E and in the deployment direction A, with low friction. "Low friction" means that the telescopic movement of the casing tubes 41, 42 and 43 takes place so freely that the axial adjustment force provided by the adjustment drive 6 is at all times adequate for a fast retraction or deployment. To ensure this, the contact surfaces, which slide on one another, on the inner side of the outer casing tube 41 and on the outer side of the inner casing tube 43, and/or both casing surfaces of the intermediate casing tube 42, may be of low-friction design, as described further above.

Figure 4:
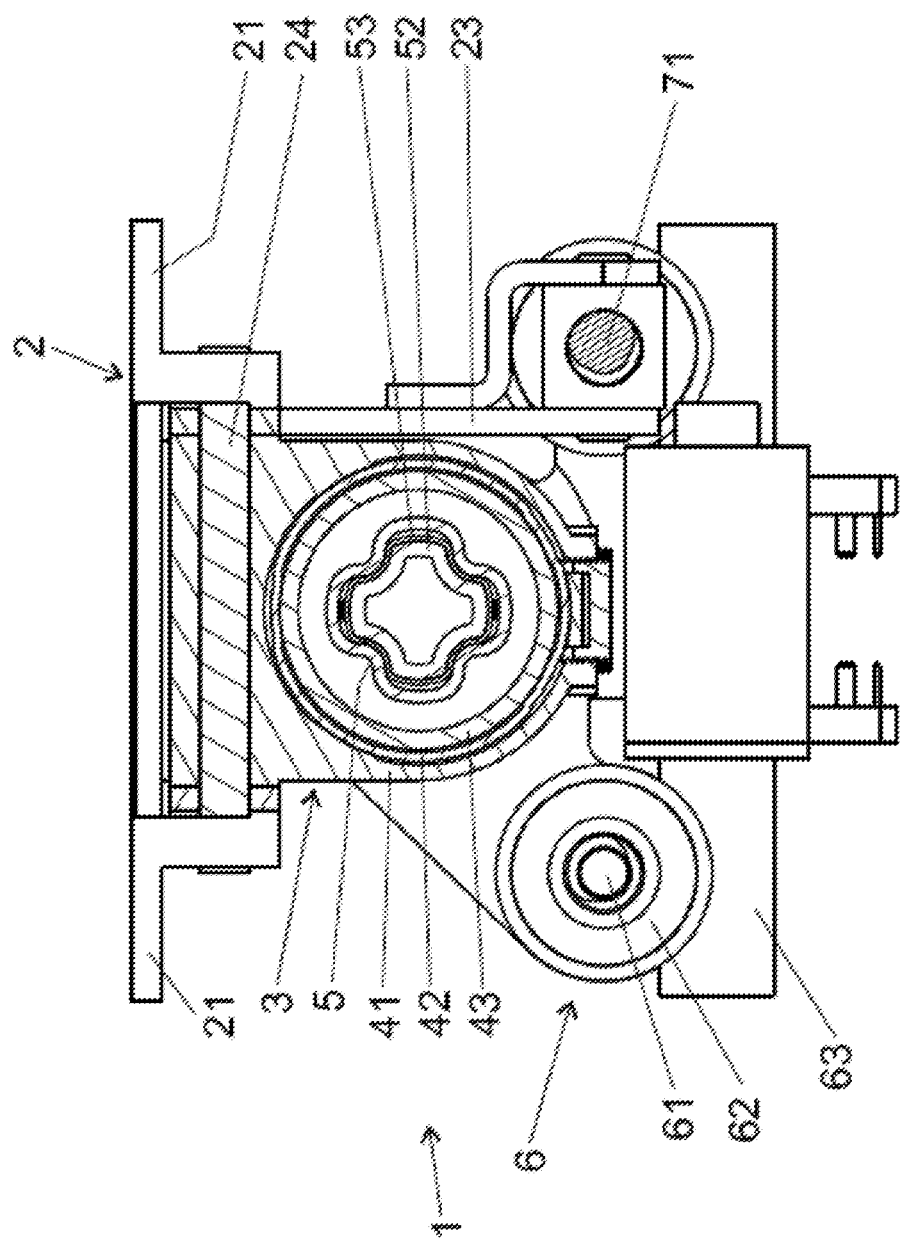
FIG. 4 is a cross-sectional view through the example steering column of FIG. 1.

The coaxial arrangement of inner casing tube 43, intermediate casing tube 42 and outer casing tube 41 can be seen particularly clearly in the cross-sectional illustration in FIG. 4.

Figure 5:
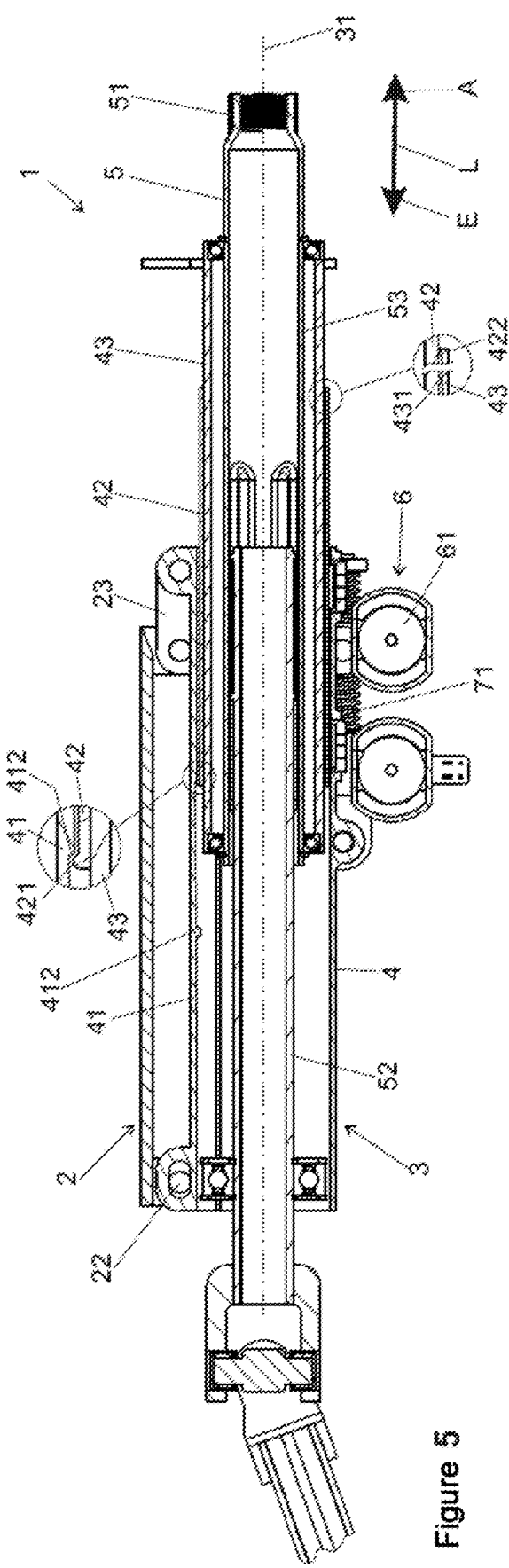
FIG. 5 is a longitudinal sectional view along a longitudinal axis through the example steering column of FIG. 1.

From the longitudinal section illustrated in FIG. 5, it can be seen that the inner casing tube 43 comprises, on its front end, an outer stop element 431 which is formed as an encircling projection which protrudes radially on the outer side, and the outer casing tube 41 comprises, on its rear end, an inner stop element 412 which is formed as a projection which protrudes radially on the inner side of said outer casing tube. The intermediate casing element 42 comprises, on its front end, a correspondingly formed outer stop element 421 and, on its rear end, a correspondingly formed inner stop element 422. The steering spindle 5 is likewise of telescopic construction with an inner steering spindle 52 and an outer steering spindle 53, which are displaceable one inside the other in a longitudinal direction L and which are connected in positively locking fashion with regard to a rotation for the transmission of a steering moment.

The inner stop element 422 of the intermediate casing tube 42 comprises a free passage cross section such that the inner casing tube 43 can move through it in telescopic fashion, wherein the outer stop element 431 on the inner casing tube 43 is dimensioned such that it can be moved through the inner cross section of the intermediate casing tube 42, which is larger than the free passage cross section of said inner stop element 422. If the inner casing tube 43 is deployed out of the intermediate casing tube 42 in the deployment direction A by the adjustment drive 6, the deployment movement is limited by virtue of the fact that the outer stop element 431 abuts axially against the inner stop element 422 in the deployment direction A.

If, during the deployment, the intermediate casing tube 43 is driven along by the outer stop element 431 of the inner casing tube 43, the intermediate casing tube 42 moves in telescopic fashion out of the outer casing tube 41 in the deployment direction A, until said intermediate casing tube likewise abuts axially with its outer stop element 421 against the inner stop element 412 of the outer casing tube 41, whereby the deployment movement of the intermediate casing tube 42 relative to the outer casing tube 41 is limited.

By means of the above-described interaction of the inner and outer stop elements 412, 421, 422 and 431, the intermediate casing tube 42 is automatically driven along by the inner casing tube 43 during the telescopic deployment of the inner casing tube 43 out of the outer casing tube 41 of the casing unit 4. Here, a sequence of the deployment may be determined by virtue of the friction force between the inner casing tube 43 and intermediate casing tube 42 being greater than that between the intermediate casing tube 42 and the outer casing tube 41, whereby firstly the intermediate casing tube 42 is moved out of the outer casing tube 41 as far as the above-described axial stop, with the inner casing tube 43 only then being deployed.

Alternatively, the friction force between inner casing tube 43 and intermediate casing tube may be predefined so as to be lower than that between the intermediate casing tube 42 and the outer casing tube 41, whereby the inner casing tube 43 is deployed first.

An adjustment of the steering wheel in a height direction H can be effected by means of a rotational movement of the adjustment lever 23 about the axis 24. For this purpose, a second adjustment drive 7 is provided, which is of similar construction to the adjustment drive 6, with a threaded spindle 71, a spindle nut 72, an electric adjustment motor 73 and a gear mechanism 74. Here, the threaded spindle 71 is driven in rotation by the adjustment motor 73 via the gear mechanism 74, which is supported on the outer casing tube 41 of the adjustment unit 3, and the spindle nut 72 is connected rotationally conjointly to the adjustment lever 23. As a result, the threaded spindle 71 being driven in rotation results in a translational displacement of the spindle nut 72, which is converted by means of the adjustment lever 23 into a movement of the adjustment unit 3 in the height direction H.

The basic advantage of the intermediate casing tube 42 according to the invention is illustrated schematically in FIGS. 6 and 7, wherein FIG. 6 shows the prior art. In the schematic illustrations, $L_{min}$ denotes in each case the length of the adjustment unit 3 in the fully retracted state, and $L_{max}$ denotes the length in the fully deployed state. $L_{mit}$ corresponds to the fully deployed state of the intermediate casing tube 42 out of the outer casing tube 41. In a realistic example situation, for the relative adjustment travel of the telescopic arrangement as per the definition given further above, there is a resulting value of $L_{max}$:$L_{min}$ ~1.5 for the steering column according to the prior art in FIG. 6, whereas, under otherwise identical boundary conditions, a value of $L_{max}$:$L_{min}$ ~2.0 is attained for a steering column according to the invention as per FIG. 7. Here, for the same absolute adjustment travel, the structural space required in the retracted state is considerably smaller, such that, in particular in applications in the field of autonomous driving, improved alternative space utilization is made possible. It is thus evident that the ratio V is defined as follows: $V=(L_{mit}-L_{min})/(L_{max}-L_{min})$.

Figure 8:
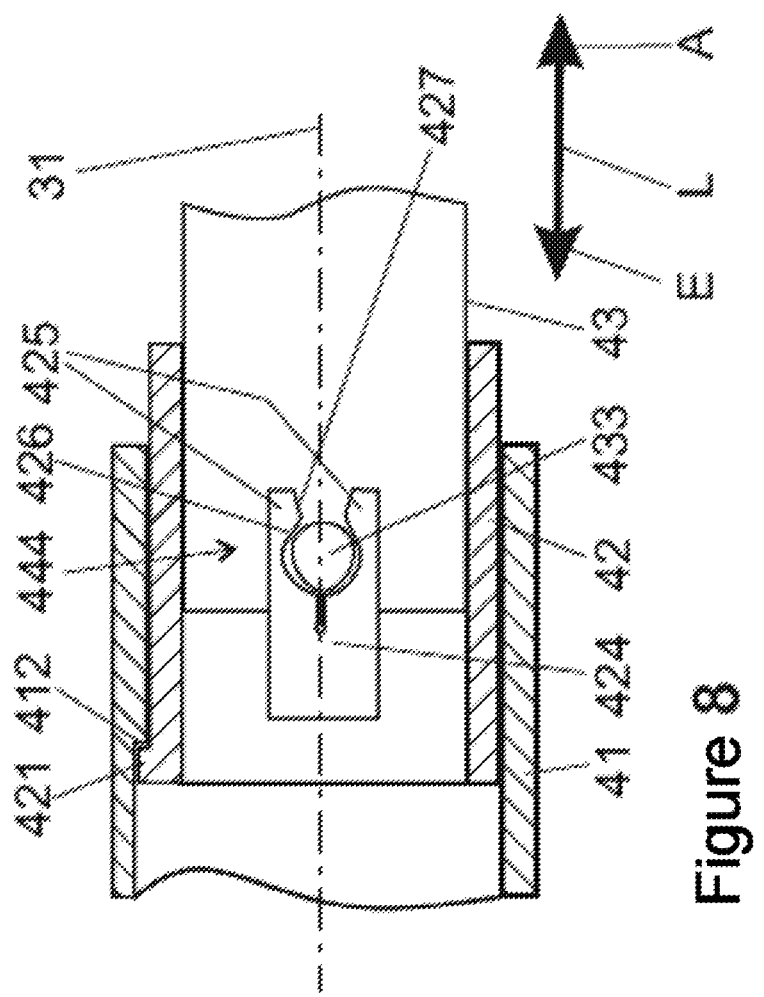
FIG. 8 is a schematic sectional view of an example casing unit with a latching device in a latched state.
Figure 9:
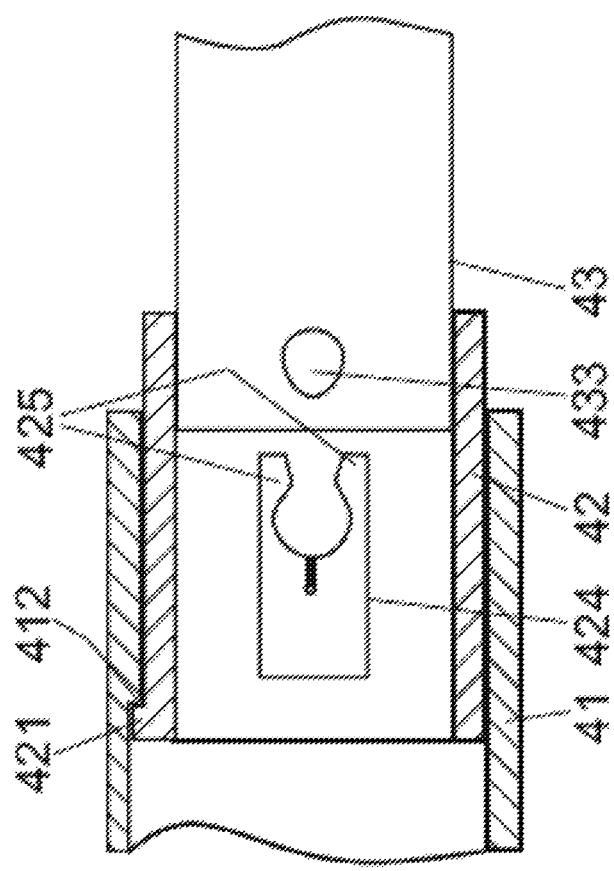
FIG. 9 is a schematic sectional view of an example casing unit with a latching device in an unlatched state.

FIGS. 8 and 9 show a schematic sectional illustration of the casing unit 4 with a latching device 444 in the latched state and in the unlatched state. Here, the intermediate casing tube 42 is connected to the latching body 424, and the bolt-like counterpart latching body 433 is connected to the inner casing tube 43. The latching body 424 comprises two spring tongues 425, which allow the counterpart latching body 433 to unlatch from the latching body 424 when the outer stop element 421 of the intermediate casing tube 42 abuts against the inner stop element 412 of the outer casing tube 41. After the unlatching of latching body 424 and counterpart latching body 433, the inner casing tube 43 can move telescopically out of the intermediate casing tube 42. The spring tongue 425 comprises a first contact surface 426 and a second contact surface 427, wherein the counterpart stop element 433 comes into contact with the first contact surface 426 during the unlatching and comes into contact with the second contact surface 427 during the latching. The angle between the second contact surface 427 and the longitudinal axis 31 is smaller, that is to say more acute, than the angle between the first contact surface 426 and the longitudinal axis 31. It can thereby be achieved that the force required for the latching is lower than the force required for the unlatching. The latching body 424 is preferably formed from plastic.

LIST OF REFERENCE DESIGNATIONS

1 Steering column
2 Support unit
21 Fastening means
22 Pivot axis
23 Adjustment lever
24 Spindle
3 Adjustment unit
31 Longitudinal axis
4 Casing unit
41 Outer casing tube
412 Inner stop element
42 Intermediate casing tube
421 Outer stop element
422 Inner stop element
424 Latching body
425 Spring tongue
426 First contact surface
427 Second contact surface
43 Inner casing tube
431 Outer stop element
433 Counterpart latching body
444 Latching device
5 Steering spindle
51 Fastening section
52 Inner steering spindle
53 Outer steering spindle
6, 7 Adjustment drive
61, 71 Threaded spindle
62, 72 Spindle nut
63, 73 Adjustment motor
64, 74 Gear mechanism
H Height direction
L Longitudinal direction
E Retraction direction
A Deployment direction
V Length ratio
$L_{max}$ Maximum length
$L_{min}$ Minimum length
$L_{mit}$ Average length

What is claimed is:

1. A motor-adjustable steering column for a motor vehicle, the motor-adjustable steering column comprising:
    a casing unit comprising an outer casing tube in which an inner casing tube is received so as to be axially displaceable in telescopic fashion, wherein an intermediate casing tube is disposed coaxially between the outer casing tube and the inner casing tube, wherein the intermediate casing tube is received in the outer casing tube so as to be axially displaceable in telescopic fashion, wherein the inner casing tube is received in the intermediate casing tube so as to be axially displaceable in telescopic fashion;
    an adjustment unit that comprises a steering spindle, wherein the steering spindle is mounted in the casing unit so as to be rotatable about a longitudinal axis;
    a support unit that is connectable to a vehicle body and holds the adjustment unit; and
    an adjustment drive that is connected to the inner casing tube and the outer casing tube, wherein by way of the adjustment drive the inner casing tube is retractable and deployable axially relative to the outer casing tube.

2. The motor-adjustable steering column of claim 1 wherein the casing unit comprises a minimum length and a maximum length, wherein the intermediate casing tube is displaceable by a maximum axial travel, wherein a ratio of the maximum axial travel to a difference between the maximum length and the minimum length is between 0.2 and 0.8.

3. The motor-adjustable steering column of claim 1 wherein with respect to an axial displacement, a first friction force between the intermediate casing tube and the outer casing tube is lower than a second friction force between the intermediate casing tube and the inner casing tube.

4. The motor-adjustable steering column of claim 1 wherein the intermediate casing tube comprises an outwardly protruding outer stop element on an outer side of the intermediate casing tube, wherein the outer casing tube comprises an inwardly protruding inner stop element, wherein a passage cross section of the inwardly protruding inner stop element is larger than a cross section of the intermediate casing tube and smaller than a cross section of the outwardly protruding outer stop element of the intermediate casing tube.

5. The motor-adjustable steering column of claim 1 wherein the intermediate casing tube comprises an inwardly protruding inner stop element on an inner side of the intermediate casing tube, wherein the inner casing tube comprises an outwardly protruding outer stop element, wherein a passage cross section of the inwardly protruding inner stop element is larger than a cross section of the inner casing tube and smaller than a cross section of the outwardly protruding outer stop element of the inner casing tube.

6. The motor-adjustable steering column of claim 1 wherein the intermediate casing tube and the inner casing tube are connectable by way of a latching device, wherein the latching device comprises:
    a latching body that is connected to the intermediate casing tube, and
    a counterpart latching body that corresponds to the latching body and is connected to the inner casing tube.

7. The motor-adjustable steering column of claim 1 wherein the adjustment drive is operatively connected to the intermediate casing tube for a constrained positioning of the intermediate casing tube relative to at least one of the inner casing tube or the outer casing tube.

8. The motor-adjustable steering column of claim 1 wherein the adjustment drive includes a spindle drive that comprises:
    a spindle nut that is disposed on a threaded spindle; and
    an electric adjustment motor by which the threaded spindle and the spindle nut are rotatably drivable relative to one another.

9. The motor-adjustable steering column of claim 8 wherein the spindle drive comprises a gear mechanism that is disposed between a motor shaft of the electric adjustment motor and the threaded spindle or the spindle nut.

10. The motor-adjustable steering column of claim 1 wherein the adjustment unit is mounted on the support unit so as to be pivotable in height about a pivot axis that is transverse to the longitudinal axis.

11. The motor-adjustable steering column of claim 10 comprising an electric height adjustment drive that is connected to the support unit and to the adjustment unit, wherein the adjustment unit is movable relative to the support unit about the pivot axis by way of the electric height adjustment drive.

* * * * *